United States Patent [19]

Matsuguchi et al.

[11] Patent Number: 4,938,506

[45] Date of Patent: Jul. 3, 1990

[54] POSTCARD WITH REVEALABLE INDICIA AND MANUFACTURING METHOD THEREOF

[75] Inventors: Noboru Matsuguchi; Tadashi Matsuguchi, both of Suita, Japan

[73] Assignee: Daimatsu Kagaku Kogyo Co., Ltd., Osaka, Japan

[21] Appl. No.: 223,573

[22] Filed: Jul. 25, 1988

[30] Foreign Application Priority Data

| Jul. 31, 1987 | [JP] | Japan | 62-193571 |
| Jul. 31, 1987 | [JP] | Japan | 62-193572 |
| May 23, 1988 | [JP] | Japan | 63-125584 |
| May 23, 1988 | [JP] | Japan | 63-125585 |

[51] Int. Cl.⁵ .................. B42D 15/00; B42D 15/02; B65D 27/00; G09F 3/00
[52] U.S. Cl. .................. 283/105; 283/101; 229/92.3; 428/43
[58] Field of Search .............. 283/100, 101, 105, 79, 283/9 R, 8 R, 6; 229/92.3; 156/64, 67, 253, 277; 428/43, 42, 40

[56] References Cited

U.S. PATENT DOCUMENTS

| 2,321,184 | 6/1943 | Butterworth | 283/105 |
| 2,812,957 | 11/1957 | Sarlund | 283/105 |
| 3,400,219 | 8/1975 | D'Amato et al. | 283/105 |
| 3,508,754 | 4/1970 | Shorim | 283/105 |
| 3,524,782 | 8/1970 | Buske | 283/105 |
| 4,204,706 | 5/1980 | Blum et al. | 283/105 |
| 4,299,637 | 11/1981 | Oberdeck et al. | 283/105 |
| 4,778,153 | 10/1988 | Bachman et al. | 283/101 |

FOREIGN PATENT DOCUMENTS 0222424 5/1987 European Pat. Off. ............ 283/105

Primary Examiner—Douglas D. Watts
Assistant Examiner—Paul M. Heyrana, Sr.
Attorney, Agent, or Firm—Jordan and Hamburg

[57] ABSTRACT

A postcard comprises a postcard material, and a sticking material adhered on the postcard material for covering at least a part of the postcard material. The sticking material comprises a base material formed with a heat adherent resin layer on its main surface, whereon an adhesion retarding layer which reduces the adhesive force of the heat adherent resin layer to weaken adhesiveness to the postcard material is formed. A perforation is formed extending from one edge of the base material to the other edge thereof at a portion where the adhesion retarding layer is formed, and the base material can be cut by the perforation. Accordingly, the sticking material can be easily peeled off from the postcard material, enabling access to various information formed thereon.

23 Claims, 21 Drawing Sheets

F I G. 18 B
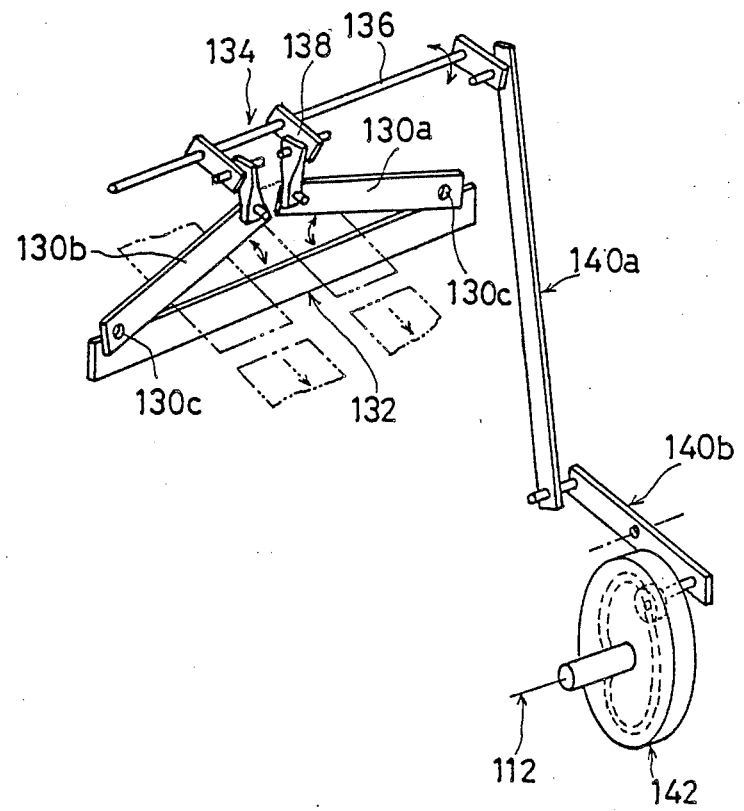

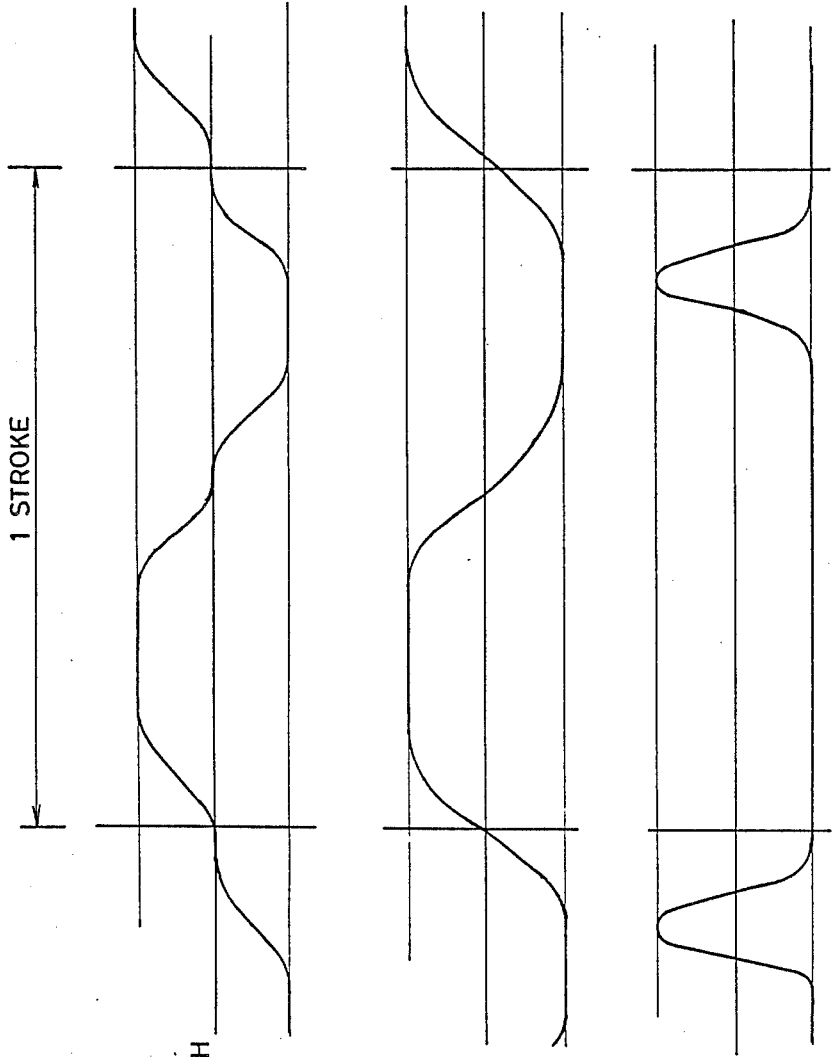

POSTCARD WITH REVEALABLE INDICIA AND MANUFACTURING METHOD THEREOF

BACKGROUND OF THE INVENTION

1. Field of the Invention

The present invention relates to a postcard and a manufacturing method thereof. More specifically, the present invention relates to a postcard which confidential matter is covered in transit by post and a just recipient can see the confidential matter suitably, and a manufacturing method thereof.

2. Description of the Prior Arts

Recently, mails printed confidential matter such as a letter of bank account are increased, and it is desired to develop a postcard which the confidential matter is covered in transit by post and the just recipient can see the confidential matter easily.

Conventionally, as seen in Japanese Utility Model Pat. Publication No. 54-3789, a postcard, which an inner-frame portion can be peeled off partially and confidential matters of the bottom layer can be seen, has been developed.

However, in order to facilitate peeling partially, as seen in Japanese Utility Model Pat. Publication No. 54-3789, a front paper must be possible to peel off partially by forming an adhesive surface formed by coating a dry paste entirely on the front paper surface, and by subjecting the other postcard material to a peeling process such as silicon processing so as to be peeled off partially or only the inner-frame portion is peeled off. Thus, in the prior art postcard, since the dry paste must be coated on the front paper side and the peeling processing such as silicon processing must be performed on the postcard material side in manufacturing, structures of the postcard become complicated and result in a high manufacturing cost due to many manufacturing processes.

Furthermore, in the postcard, as a part for hooking a finger and a fingernail thereto is not formed in the inner-frame, it is difficult to peel the inner-frame portion.

SUMMARY OF THE INVENTION

Therefore, it is a principal object of the present invention to provide a postcard, in which surface treatment of the postcard material is not required any only by post-processing of the sticking material for covering a confidential matter, a portion which is possible to be peeled off partly and a portion which is adhered completely are divided, in which the confidential matter is covered in transit by post and the just recipient can see the confidential matter easily, and a manufacturing method thereof.

A postcard in accordance with the present invention comprises a postcard material, and a sticking material adhered on the postcard material for covering at least a part of the postcard material, wherein the sticking material comprising a base material formed with a heat adherent resin layer on its main surface, whereon an adhesion retarding layer which reduces the adhesive force of the heat adherent resin layer to weaken adhesiveness to the postcard material is formed, and a perforation is formed extending from one edge of the base material to the other edge thereof at a portion where the adhesion retarding layer is formed, the base material can be cut by the perforation.

A manufacturing method of a postcard in accordance with the present invention comprises a process for preparing a postcard material, a process for printing and coating picture lines on the postcard material, a process for forming a sticking material by forming a heat adherent resin layer on a base material and by forming an adhesion retarding layer which reduces the adhesive force of the heat adherent resin layer to weaken adhesiveness to the postcard material, a process for forming a perforation extending from one edge of the base material to the other edge thereof at a portion where the adhesion retarding layer is formed, and a process for adhering the heat adherent resin layer to the postcard material by attaching the heat adherent resin layer to the postcard material and by pressing and heating said sticking material.

According to the present invention, since the adhesive surface of the sticking material to the postcard material is divided into the exposed portion of the heat adherent resin layer and the adhesion retarding layer which reduces the adhesive power of the heat adherent resin layer to weaken its adhesiveness to the postcard material, when heated and adhered thereto, the exposed portion of the heat adherent resin layer is adhered strongly to the postcard material, whereas the portion formed with the adhesion retarding layer is adhered more weakly thereto.

The base material is easily cut and separated by the perforation formed extending from one side thereof to the other side thereof at a portion where the adhesion retarding layer is formed.

Accordingly, in the postcard, the sticking material can be peeled off relatively easily from the postcard material at the portion of adhesion retarding layer, thereby enabling access to various information formed on the postcard material.

Moreover, according to the present invention, since the postcard divided into the portion adhered temporarily and the portion adhered completely can be obtained by heating and adhering the sticking material to the postcard material without processing the postcard material, only heat processing is required in manufacturing, enabling broad applications.

Then, a just recipient can easily cut the base material by the perforation formed on the base material of the sticking material.

Besides, the postcard is just needed to be processed to the sticking material in manufacturing and the postcard material is not necessary to be processed, so that its manufacturing process as well as an adhesion machine of a sticking material used in manufacturing postcards can be simplified with ease.

The above and other objects, features and advantages of the present invention will be more apparent from the following detailed description taken in connection with the accompanying drawings.

BRIEF DESCRIPTION OF THE DRAWINGS

FIG. 6 is a view showing an original state thereof, and FIG. 7 is a view showing a peeled state thereof.

FIG. 9A is a view showing an original state thereof, FIG. 9B is a view showing a peeled state thereof.

FIG. 18B is a diagrammatical view showing an essential portion on the backside of the sticking material cutter.

FIG. 20 is a view showing a time chart of the adhesion machine shown in FIG. 15.

FIG. 22A is a perspective view showing an original state thereof, and FIG. 22B is a partially sectional view thereof.

FIG. 24A is a perspective view thereof, and FIG. 24B is a partially sectional view thereof.

DESCRIPTION OF THE PREFERRED EMBODIMENTS

Figure 1:
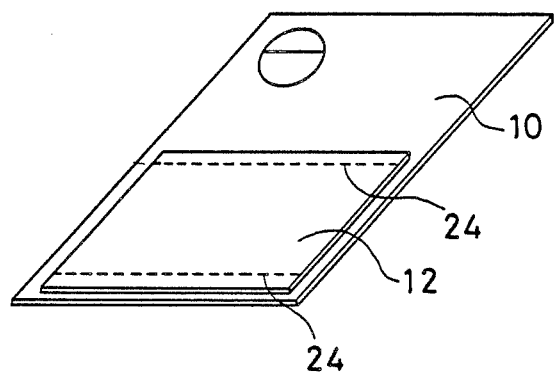
FIG. 1 is a perspective view of a postcard of one embodiment of the present invention.

FIG. 1 is a perspective view showing one example of a postcard according to the present invention.

Figure 2:
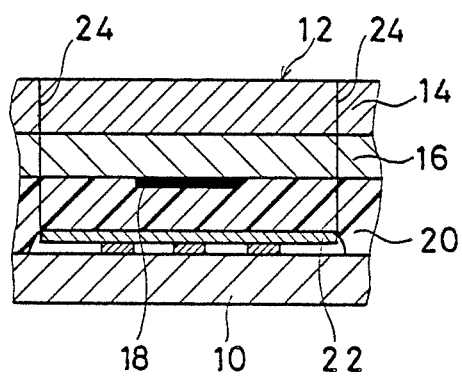
FIG. 2 is a partially sectional view of the embodiment of FIG. 1.

FIG. 2 is a partially sectional view thereof.

The postcard includes a postcard material 10 of the postal card size and a sticking material 12 adhered on a part of the postcard material 10.

The sticking material 12 includes a base material 14. The base material 14 is formed with a relatively soft material such as paper, synthetic resin film and the like which can be cut by a scissors or the like, and a suppression layer 16 is formed on one main surface thereof.

The suppression layer 16 is formed by printing a silver ink and the like or laminating a film material such as an aluminum foil having a suppressiveness with adhesives.

On the surface of the suppression layer 16, a lottery 18 is formed by printing a letter such as "winning" or "lose".

Furthermore, on the surface of the suppression layer 16, a heat adherent resin layer 20 is formed by coating the heat adherent resin as heating and extruding it, or by gravure or silk screen printing as dissolving it in a solvent or despersing in water.

The heat adherent resin layer 20 is formed to melt at about 100° C. to 200° C. so as to be adhered completely to the postcard sheet 10 such as the paper.

On the main surface of the heat adherent resin layer 20, an adhesion retarding layer 22 which reduces its adhesive power partly to weaken adhesiveness to the postcard material 10 is formed partly.

The adhesion retarding layer 22 is formed by printing and coating a suitably selected resin which, when the heat adherent resin layer 20 is heated and melted, has adhesiveness only at the temperature higher than the nonadherent resin or the resin selected as the heat adherent resin forming the heat adherent resin layer 20.

In this embodiment, the heat adherent resin layer 20 and the adhesion retarding layer 22 are formed of transparent materials or translucent materials for enabling access to the lottery 18 through these layers 20 and 22. But, when the lottery 18 is formed on surface of the adhesion retarding layer 22, these layers 20 and 22 may be made of opaque materials.

Furthermore, perforations 24 are formed on both sides of the sticking material 12 along the edge thereof.

As an example of heat adherent resin, adhesives of EVA group may be selected. The composition comprises an EVA (ethylene-vinyl acetate copolymerized resin), tackifier, wax and anti-oxidant, to which sometimes a plasticizer and filler are added as an adjuvant.

As the tackifier there are glycerin of partially hydrogenated rosin, glycerin-ester of rosin, pentaerythritol modified rosin, petroleum resin, α-methylstyrene/vinyl toluene copolymer, terpene oil polymer and terpene-phenol polymer, etc.

As the wax, there are paraffin wax, microcrystalline wax, low molecular weight polyethylene wax, Fischer-Tropsch wax, caster wax and chlorinated paraffin, etc.

As the anti-oxidant, there are hindered phenol group compound, salicylic acid group compound, benzophenone group compound, benzotriazol group compound, phosphorus group compound, sulfur group compound, organic metal group compound, etc.

As the heat adherent resins other than the aforesaid examples, there are polyethylene, ethylene-ethylacrylate copolymerized resin, ethylene-acrylic acid copolymerized resin, ethylene-methyl acrylate copolymerized resin, ethylene-methyl methacrylate, ethylene-methacrylic acid copolymerized resin, ionomer resin, polymethylpentene resin, ethylene-vinylalcohol copolymerized resin, vinylidene chloride resin, vinyl chloride-vinyl acetate copolymerized resin, polyamide resin, stylene-acrylic acid copolymerized resin, polystylene resin, polyacrylic acid copolymerized resin, polyester resin, polyurethane resin, waxes, etc. When printing and coating, these resins can be suitably used as heating or dissolving in a solvent or dispersing in water.

As an example of adhesion retarding layer 22, materials which show adhesiveness at the higher temperature than the heat adherent resin or not at all may be selected.

For example, an ultraviolet ray curing ink may be selected. The ultraviolet hardening ink comprises a color material, pre-polymer, monomer, light initiator, sensitizer and additives. As the pre-polymer, there are epoxy acrylate, polyolacrylate, polyester acrylate, polyether acrylate, unsaturated polyester, cationic polymerizing resin, melamine acrylate, unsaturated polybutadiene, drying oil acrylate and silicon acrylate.

As the monomer, there are monofunctional acrylates such as 2-ethyl acrylate, 2-hydroxyethyl acrylate, 2-hidroxypropyl acrylate and 2-hydroxyethyl methacrylate, and bifunctional acrylates such as 1, 3-butanediol diacrylate, 1, 4-butanediol diacrylate, 1, 6-hexanediol diacrylate, diethylene glycol diacrylate, neopentilglycol diacrylate, polyethylene glycol #400 diacrylate, hydroxybivalic acid ester neobenzyl glycol diacrylate, diethylene glycol dimethacrylate and polyethylene glycol #200 dimethacrylate, etc. and multifunctional acrylates such as trimethylolpropane triacrylate, pentaerythritol triacrylate, trimethylolpropane trimethacrylate, trimethylolethane trimethacrylate, tetramethylolmethane tetraacrylate, dipentaerythritol hexaacrylate, etc. In addition vinyl ether, itaconic acid ester and N-vinyl pyrolidone may be used.

As the light initiators, there are biacetyl, acetophenone, benzophenone, Michler's ketone, benzyl, benzoin, benzoin isobutyl ether, benzyl dimethylketal, tetramethylthiuram sulfide, azobisisobutylnitrile, benzoyl peroxide, 1-hydroxycyclohexilphenyl ketone, α-hydroxyisobutyl phenone, p-isopropyl-α-hydroxyisobutyl phenone, etc., in particular, benzophenone and its derivatives are used.

As the sensitizers, there are aliphatic amines such as n-butyl amine, di-n-butyl amine, triethyl amine, diethyl-aminoethyl methacrylate, etc., nitrogen heterocyclic compounds such as amines containing aromatic radical, piperizene, etc. sulfur compounds such as allyl group, O-tolylthiourea, sodium diethyldithiophosphate, soluble salt of aromatic sulfinic acid, etc., phosphorus compounds such as N, N-disubstituent-p-aminobenzonitrile compound, tri-n-butyl phosphine, sodium diethylthiophosphate, etc. and nitrogene compounds such as Michler's ketone, N-nitrosophydroxylamine derivatives, oxazoline compound, etc. and chlorine compounds such as carbon tetrachloride, hexachloroethane, etc.

As the additives, there are an anti-mist agent, lubricant, anti-oxidant, drying agent, wetting agent, wax, etc.

As the color materials, there are an organic pigment, body pigment, carbon black, titanium dioxide, metal powder, etc.

Next, a method of manufacturing the postcard will be explained.

First, a method of manufacturing the sticking material 12 will be explained.

Paper forming the base material 14 is prepared and on one main surface thereof, the suppression layer 16 is formed by allover printing with a silver ink, for example, by the known printing method as the offset printing or coating.

The lottery 18 is formed on the surface of the suppression layer 16 by printing a letter such as "winning", "lose" or "number".

Figure 4:
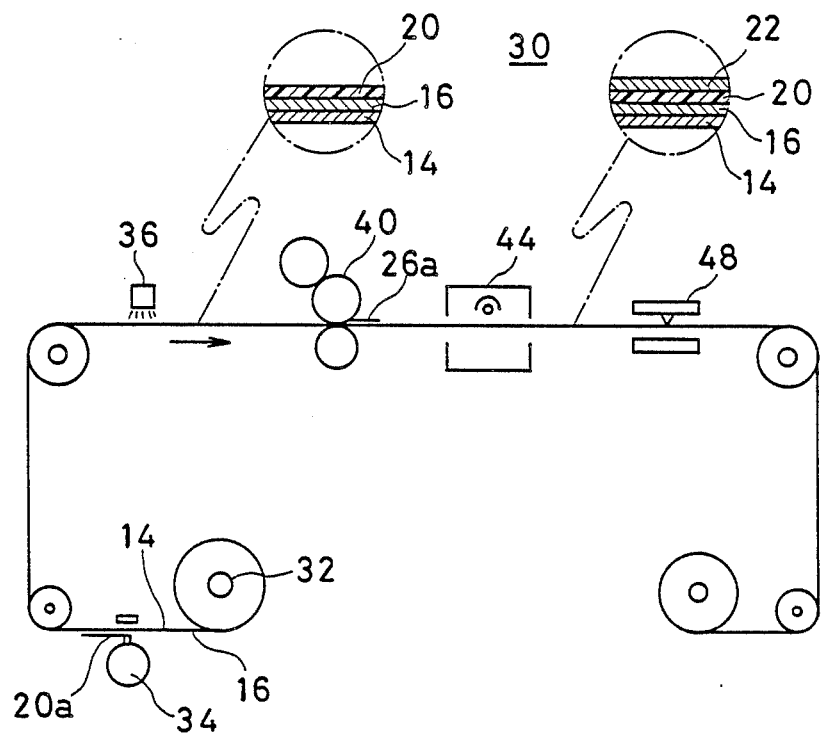
FIG. 4 is a diagrammatical view of a manufacturing machine showing one example of manufacturing process of the sticking material.
Figure 5:
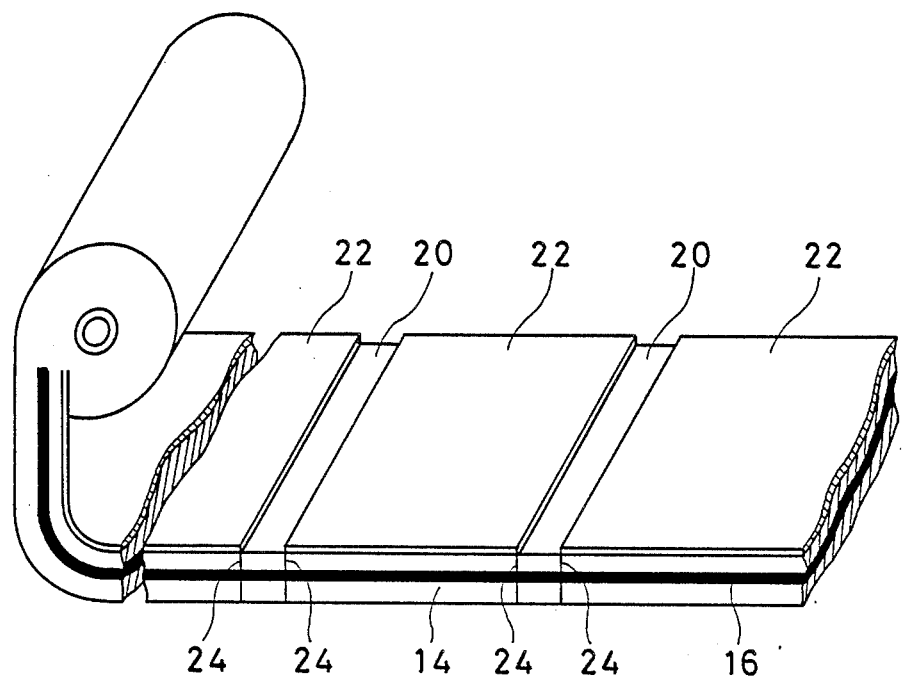
FIG. 5 is a perspective view of the sticking material.

As showing FIG. 4, a rolled laminate comprising the base material 14 formed with the suppression layer 16 is mounted on a hold roller 32 of a sticking material manufacturing machine 30.

The base material 14 held by the hold roller 32 is loosen at one end and led to a heat adherent resin coater 34.

The heat adherent resin coater 34 is designed to print and coat the heat adherent resin 20a containing, for example, the aforesaid ethylene-vinyl acetate copolymerized resin as a main component, on the suppression layer 16 of the base material 14 while heating to a suitable temperature.

The base material 14 onto which the heat adherent resin 20a is printed and coated is then guided to a dryer 36 including a cold air blower, whereby the heat adherent resin 20a is dried and the heat adherent resin layer 20 is formed.

Next, the base material 14 formed with the heat adherent resin layer 20 is directed to a printing and coating unit 40 of an adhesion retarding agent 22a.

The coating unit 40 is the printing or coating machine utilizing known printing and coating methods such as a typographic printing, gravure printing, silk screen printing, offset printing or the like.

When printing and coating the ultraviolet ray curing ink, for example, the typographic printing machine is selected and 4 to 6 g/m$^2$ of ultraviolet ray curing ink is coated.

The base material 14 onto which the adhesion retarding agent 22a is printed or coated is led to a solidifier 44. As the solidifier 44 in the present embodiment, a high voltage mercury lamp is used to irradiate 160 W/cm per second.

Thus, the sticking material 12 is formed with the suppression layer 16, the heat adherent resin layer 20 and the adhesion retarding layer 22 on the base material 14. In addition, the adhesion retarding layer 22 is formed with a distance in the wide direction of the base material 14.

The sticking material 12 is led to a perforator 48 for cutting perforations 24 for separation, thereby forming the perforations 24 at a prescribed distance, and then is rolled again.

The rolled sticking material 12 is cutting in the portion between the perforations 24, and is adhered on the lower column of the surface of the postcard material 10. In this case, when a confidential matter such as a bank account is formed on a portion of the surface of the postcard material and the confidential information is covered with the sticking material 12, the confidential matter is formed on the portion before covering with the sticking material 12. Also, when a lottery is formed on the surface of the postcard material 10, the lottery is formed before covering with the sticking material 12.

Figure 3A:
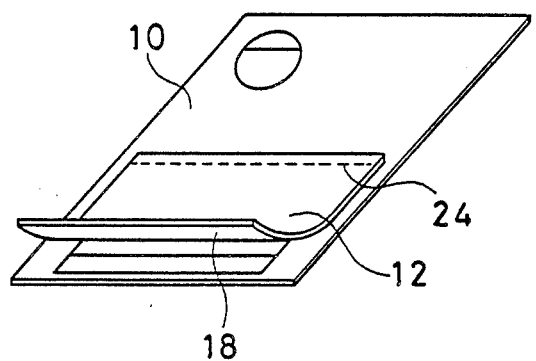
FIG. 3A is a perspective view showing in a state which a sticking material of the embodiment of FIG. 1 is peeled off.
Figure 3B:
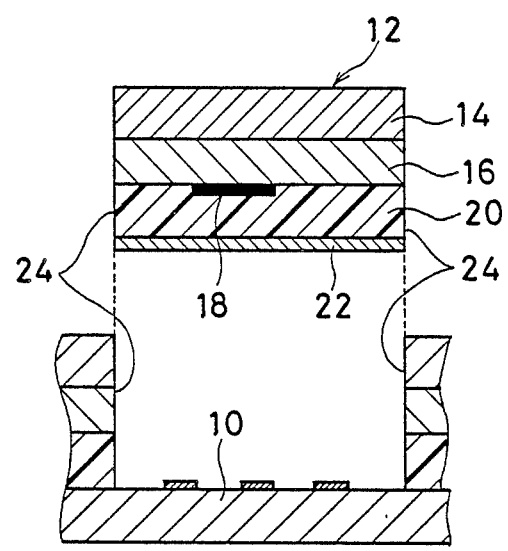
FIG. 3B is a partially sectional view in the state.

In the postcard, the sticking material 12 is sticked strongly to the postcard material 10 at the exposed portion of the heat adherent resin layer 20, and at the portion where the adhesion retarding layer 22 is formed the heat adherent resin layer 20 of the bottom layer is adhered weakly. Thus, as shown in FIG. 3A and FIG. 3B, the sticking material 12 can be peeled off relatively easily from the postcard material 10 at the portion where the adhesion retarding layer 22 is formed.

As the example of base material 14, besides the aforesaid example, there are films of synthetic paper, cellophane, polyethylene, polyester, etc. or an aluminum foil and the like. However, relatively soft materials are preferably selected as the base material 14 such that when the sticking material 12 is adhered to the postcard material 10, it will not come off easily therefrom against the adhesive force of the heat adherent resin layer 20 by the adhesive retarding layer 22 formed.

When the aluminum foil and the like having a good suppression is selected as the base material 14, the suppression layer 16 is not necessary as the aforesaid embodiment.

Though the rolled continuous paper is selected as the base material 14 in the foregoing embodiment, the base material separated into each piece, so-called, sheets may be selected.

Also, on the base material 14, any suitable printing which fits to properties of the postcard may be performed, or when the continuous material is used as aforesaid embodiment, for example, a detecting mask for detecting feeding pitches of the base material 14 may be printed with a black color or the like.

Figure 6:
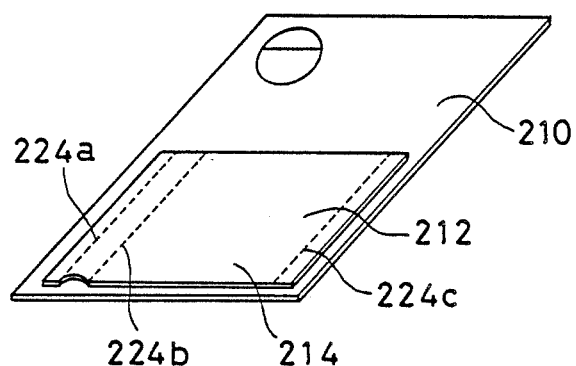
FIG. 6 and FIG. 7 are perspective views showing another embodiment.
Figure 7:
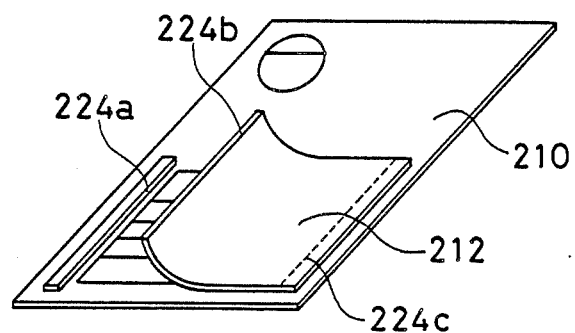

FIG. 6 through FIG. 9 are views showing another embodiment. FIG. 6 and FIG. 7 are perspective views showing the embodiment, FIG. 6 is a view showing an original state thereof, and FIG. 7 is a view showing a peeled state thereof.

In this embodiment, perforations 224a and 224b are formed on the left side of a sticking material 212 in a portion where an adhesion retarding layer 222 is formed. The perforations 224a and 224b are formed extending from one edge of the sticking material 212 to the other edge thereof, and are parallel with each other at a narrow distance. Thus, the base material 214 can be cut off.

Furthermore, between the perforations 224a and 224b, one edge of the base material 214 is chipped, thus the edge can be easily peeled by a finger and a fingernail, and the base material 214 can be easily cut off. On the edge of the base material 214 between the perforations 224a and 224b, a protruding piece for picking the base material 214 easily may be formed in place of the edge is chipped.

Also, a perforation 224c for separation is formed to the right-side of the sticking material 212 and to cut the sticking material 212 peeled from a postcard material 210 from a portion adhered completely with a heat adherent resin layer 220.

When the base material 214 is made of paper, the perforations 224a, 224b and 224c are formed along a direction which is a paper feeding direction in a papermaking, that is, a paper fiber line direction.

Also, a lottery 218 is formed on the postcard material 210 in this embodiment.

Figure 8:
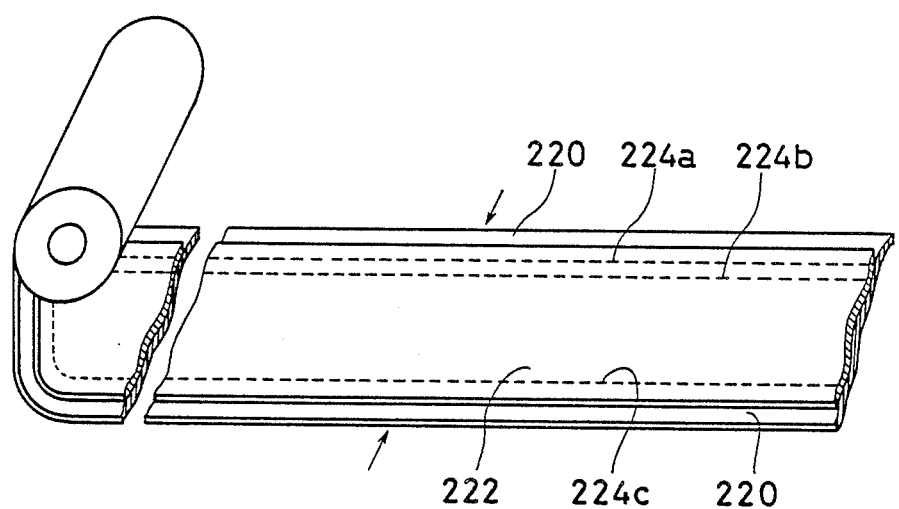
FIG. 8 is a view of a sticking material of the embodiment of FIG. 6 and FIG. 7.
Figure 9A:
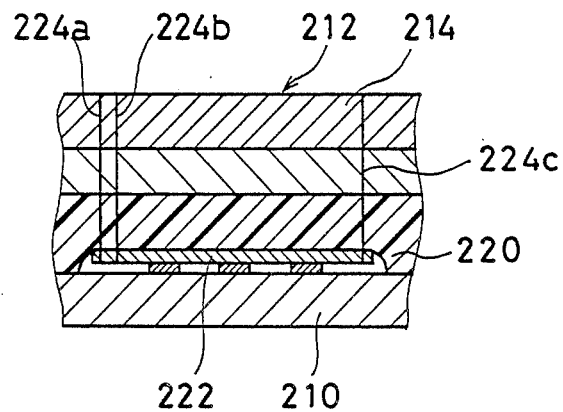
FIG. 9A and FIG. 9B are partially sectional views of the embodiment of FIG. 6 and FIG. 7.
Figure 9B:
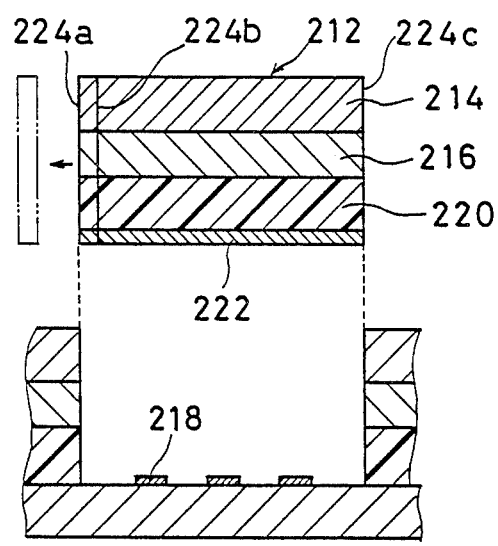

In this embodiment, as shown in FIG. 8, first, on one main surface of the base material 214, the suppression layer 216, the heat adherent resin layer 220 and the adhesion retarding layer 222 are formed, thus the sticking material 212 is formed in a belt.

Next, the base material 214 is led to a perforator for cutting the perforations 224a, 224b and 224c, thereby forming the perforations 224a, 224b and 224c at a distance, and then is rolled.

The rolled base material 214 is led to an adhesion machine for adhering the sticking material 212 to the postcard material 210, thereby the sticking material 212 is heated and adhered to the postcard material 210, thus a postcard is formed.

Figure 10:
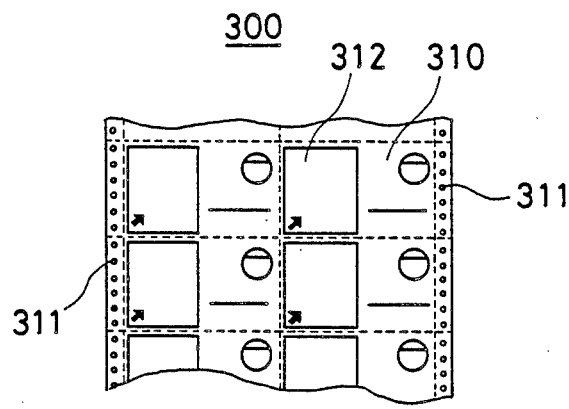
FIG. 10 is a surface view or a separate embodiment.
Figure 11:
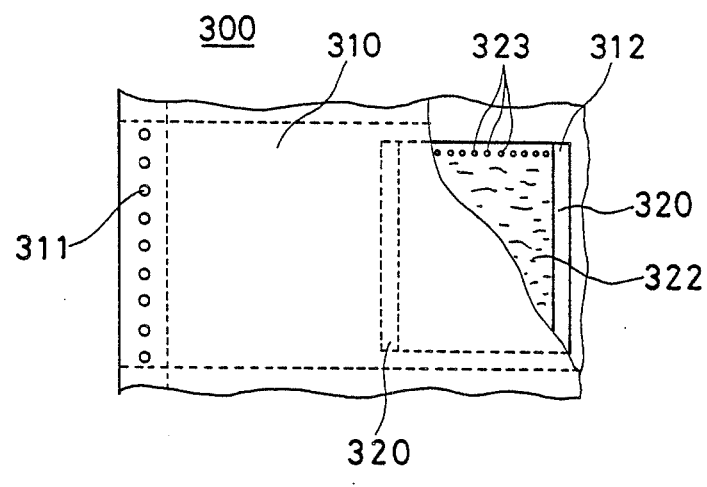
FIG. 11 is a backside view of the embodiment of FIG. 10.

FIG. 10 is a surface view of a separate embodiment. FIG. 11 is a backside view thereof.

A continuous postcard 300 includes a postcard material 310 of the postal card size and a sticking material 312 adhered on a part of the postcard material 310.

Figure 14:
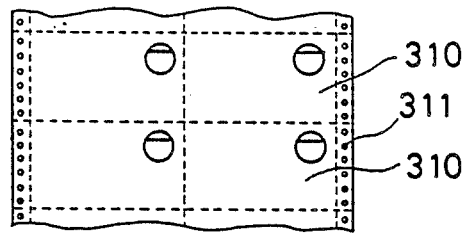
FIG. 14 is a surface view of a continuous raw paper of the embodiment of FIG. 10.
Figure 15:
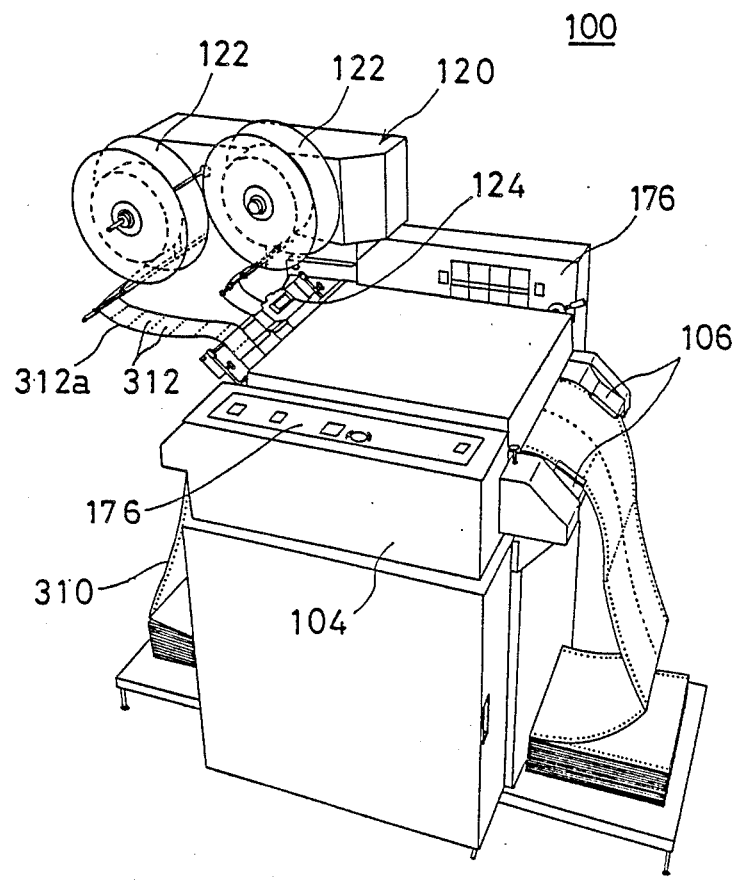
FIG. 15 is a perspective view generally showing an adhesion machine of a sticking material.

The continuous postcard 300, as shown in FIG. 14, includes a continuous raw paper 310a which is formed separably into the postcard material 310 of the postal card size. That is, on boundary lines of each postcard material 310, perforations are formed suitably to form each postcard, and at opposite ends of the continuous raw paper 310a, sprocket holes 311 are formed continuously at a suitable distance.

In the present invention, as the continuous raw paper 310a, thin materials such as synthetic paper and other synthetic resin sheets and the like are used besides the typical paper.

Figure 12A:
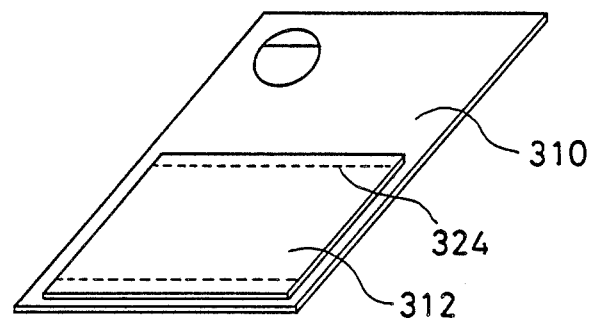
FIG. 12A is a perspective view of a postcard of the embodiment of FIG. 10.
Figure 12B:
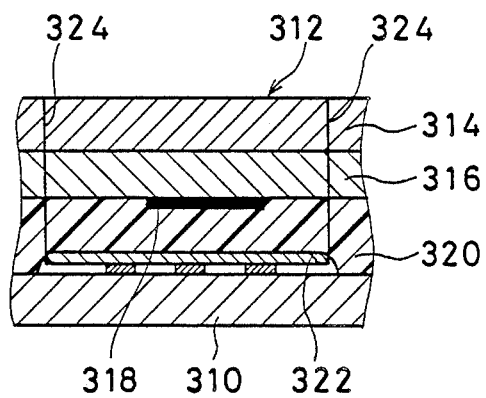
FIG. 12B is a partially sectional view thereof.

The sticking material 312, which is adhered on a portion provided with confidential matter such as finance and insurance account on the surface of the postcard material 310, will be explained in refer to FIG. 11 and FIG. 12B principally.

The sticking material 312 includes a base material 314, a suppression layer 316, a lottery 318, a heat adherent resin layer 320, an adhesion retarding layer 322 and perforations 324, as same as the sticking material 12 of the postcard of FIG. 1.

Figure 13:
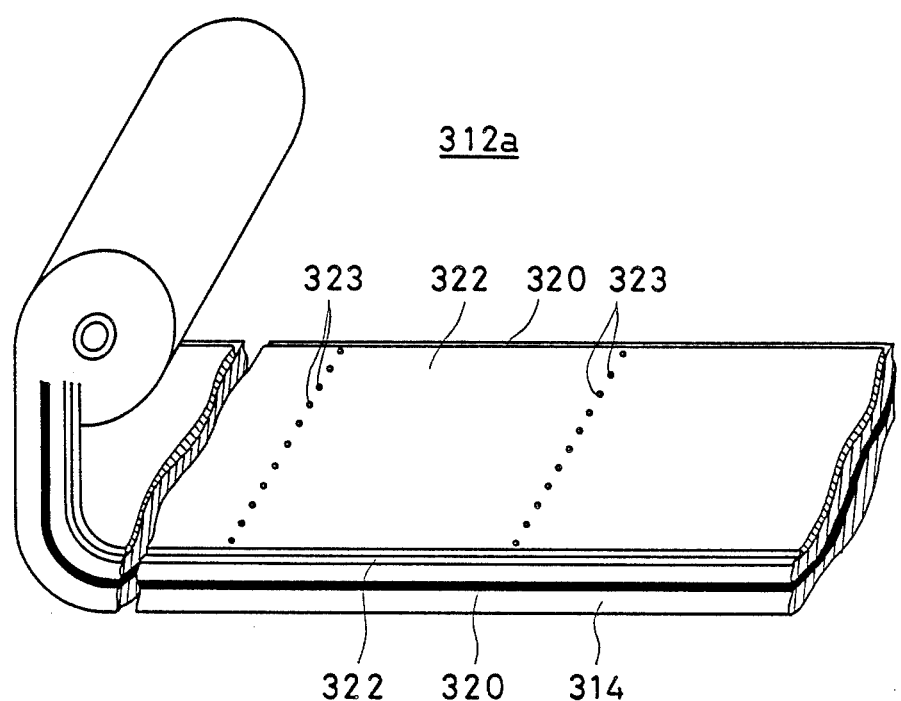
FIG. 13 is a perspective view of a sticking material of the embodiment of FIG. 10.

In this embodiment, as shown in FIG. 11 and FIG. 13, at the upside and downside of the postcard material 310, that is, the sprocket holes 311 sides of the continuous raw paper 310a, portions where the adhesion retarding layer 322 is not formed are present in a fixed width. Moreover, at the front end of the sticking material 312 in the breadthwise direction of the continuous raw paper 310a, exposed spots 323 where the adhesion retarding layer 322 is not formed are present to expose the heat adherent resin layer 320 in spots. Thus, adhesion takes place weaker at the portion where the adhesion retarding layer 322 is formed and stronger at the portion where not formed.

Though the exposed spots 323 are formed at the front end of the sticking material 312, they may be formed on both the front and rear ends or on either end. Moreover, the portion formed on the other end of the sticking material 312 where the heat adherent resin layer 320 is exposed totally by a fixed width may be used in place of the exposed spots 323.

The sticking material 312 is formed by a method as same as the method for manufacturing the sticking material 12 of the postcard of FIG. 1.

Next, a method for adhering the sticking material 312 to the surface of the continuous raw paper 310a will be explained on the basis of an adhesion machine shown in FIG. 15 through FIG. 20.

The adhesion machine 100 of the sticking material comprises a continuous paper transfer unit 102 which is designed to feed the continuous raw paper 310a to the position where the sticking material 312 is adhered.

The continuous paper transfer unit 102 includes transfer sprockets 106 formed substantially on opposite ends of a adhesion machine body 104, and an adhesive portion transfer device 108 which is formed substantially in the center of the adhesion machine body 104 to transfer the continuous raw paper 310a in the transferring direction by a suitable distance which, in the present embodiment, corresponds to the length of a sheet of sticking material 312 adhered to the postcard material 310. The transfer sprockets 106 which are designed to rotate belts formed with projections which engage to the sprocket holes 311 of the continuous raw paper 310a, successively engage the projections to the sprocket holes 311 to transfer the continuous raw paper 310a.

Figure 16A:
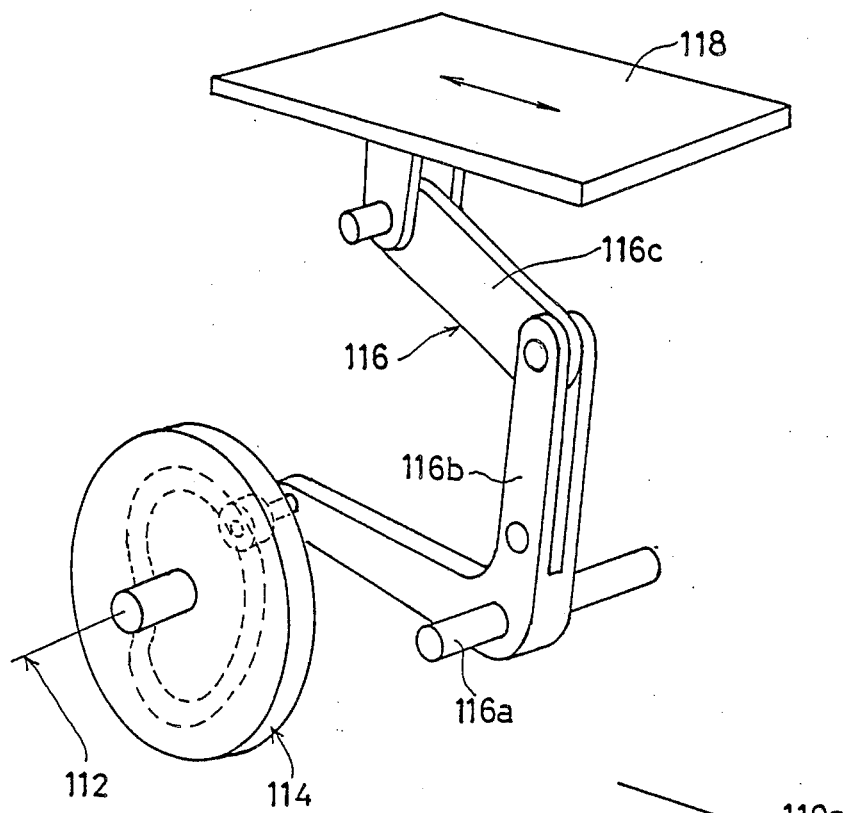
FIG. 16A and FIG. 16B are diagrammatical views of an adhesive portion transfer unit.

The adhesive portion transfer device 108, as shown in FIG. 16A, includes a continuous paper transfer cum 114 secured to a shaft 112 disposed across the front and rear of the adhesion machine body 104. A suitable groove is formed in the body of the continuous paper transfer cum 114 which gives suitable vertical and front-to-back movements to a link mechanism 116 by its uniform rotation. By the action of the link mechanism 116, an adhesive portion transfer table 118 fixed to the link mechanism 116 is moved back and forth continuously or intermittently. That is, the link mechanism 116 includes a link 116b which is fixed rockably to the adhesion machine body 104 with a pivot shaft 116a and a link 116c fixed rotatably to the adhesive portion transfer table 118, and the link 116b is pivotally fixed to the link 116c. The adhesive portion transfer table 118 is move back and forth through the link mechanism 116 by rotation of the continuous paper transfer cum 114.

Figure 16B:
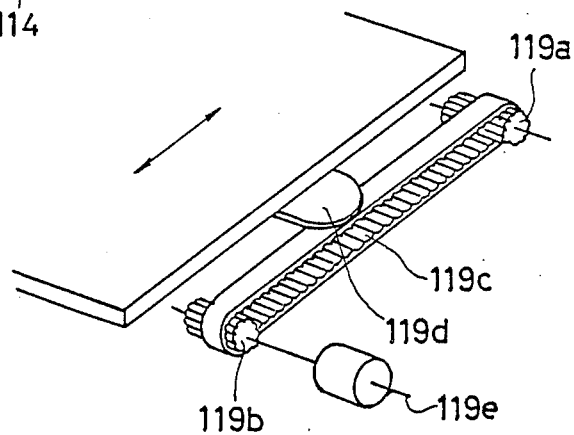

The amount of continuous raw paper 310a transferred in the continuous paper transfer unit 102, as shown in FIG. 16B, is detected by a synchronizing device 119. That is, a portion of the adhesive portion transfer table 118 is connected to a timing belt 119c mounted between timing pullies 119a and 119b provided at the front and rear of the adhesion machine body 104 by a connecting piece 119d, thereby the transferring distance of the adhesive portion transfer table 118 is detected by a pulse signal from an encoder 119e coupled to the timing pully 119b to control the rotation of a pulse motor which is a drive source formed on the continuous paper transfer unit 102 for the overall control.

Figure 17:
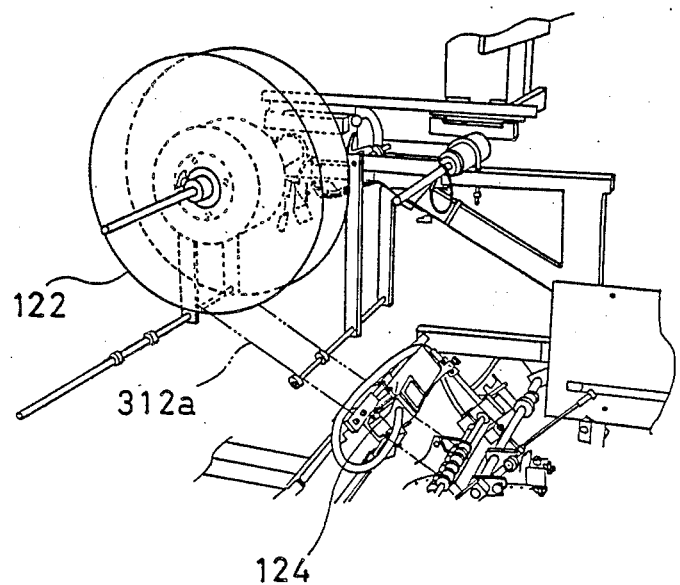
FIG. 17 is a perspective view showing an essential portion of a sticking material transfer unit.
Figure 18A:
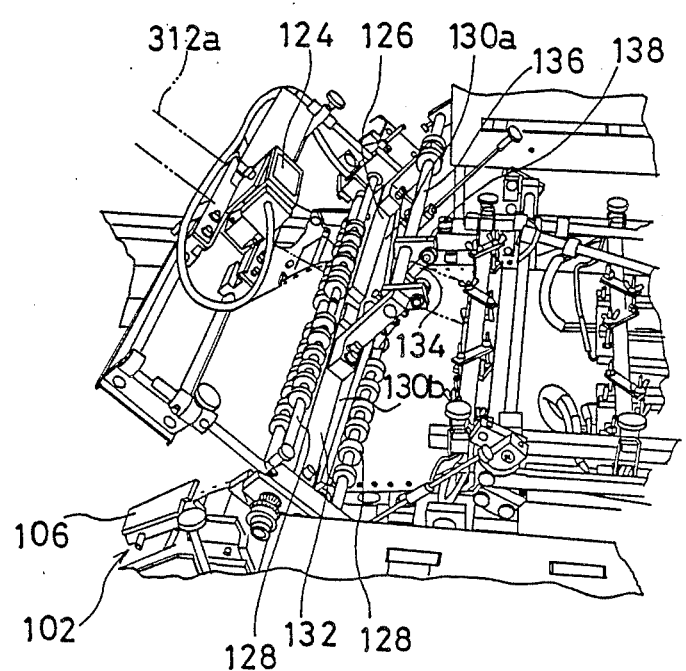
FIG. 18A is a perspective view showing aroud a sticking material cutter on the downstream side of the unit shown in FIG. 17.

Next, a transfer unit of the sticking material 312 which is adhered to the surface of the continuous raw paper 310a fed successively by the continuous paper transfer unit 102 will be explained with reference to FIG. 17, FIG. 18A and FIG. 18B.

The sticking material transfer unit 120 includes a reel 122 whereon the rolled continuous sheet 312a of the sticking material continuously formed by the sticking material 312 is mounted, a sticking material detector 124 which detects the transferring amount of the continuous sheet 312a pulled out from the reel 122 and the arrival of the continuous sheet 312a at a specified position to output the electrical signal to a controller of the sticking material transfer unit 120, and a sticking material cutter 126 which is disposed on the downstream side from the sticking material detector 124 to cut the continuous sheet 312a into a suitable length.

In the sticking material transfer unit 120, at the front and rear of the sticking material cutter 126 which cuts the continuous sheet 312a, a pair of sticking material carries 128 comprising rubber rings fixed to a shaft and rotatable as contacting each other are disposed.

The continuous sheet 312a of the sticking materials clamped between the rings of the pair of sticking material carriers 128 is carried to the suitable position on the surface of the continuous raw paper 310a by the rotation of the sticking material carriers 128.

The sticking material cutter 126 includes cutter blades 130a and 130b. The cutter blades 130a and 130b are fixed to a cutter body 132 pivotally about pivot axes 130c at one end and to a link mechanism 134 at the other end (refer to FIGS. 18A and 18B).

The link mechanism 134 is fixed pivotally to a cutter shaft 136 fixed pivotally to the cutter body 132 through a fixed piece 138, and the cutter shaft 136 is connected to a disc 142 formed with a cum groove through links 140a and 140b as shown in FIG. 18B. The disc 142 is fixed to the shaft 112 which secures the continuous paper transfer cum 114.

Accordingly, as the disc 142 rotates the cutter shaft 136 is rotated by the action of cum groove formed in the disc 142 through the links 140a and 140b, thereby the cutter blades 130a and 130b are pivoted about the pivot axes 130c fixed to the cutter body 132 to cut the continuous sheet 312a of the sticking material into the suitable size.

Figure 19A:
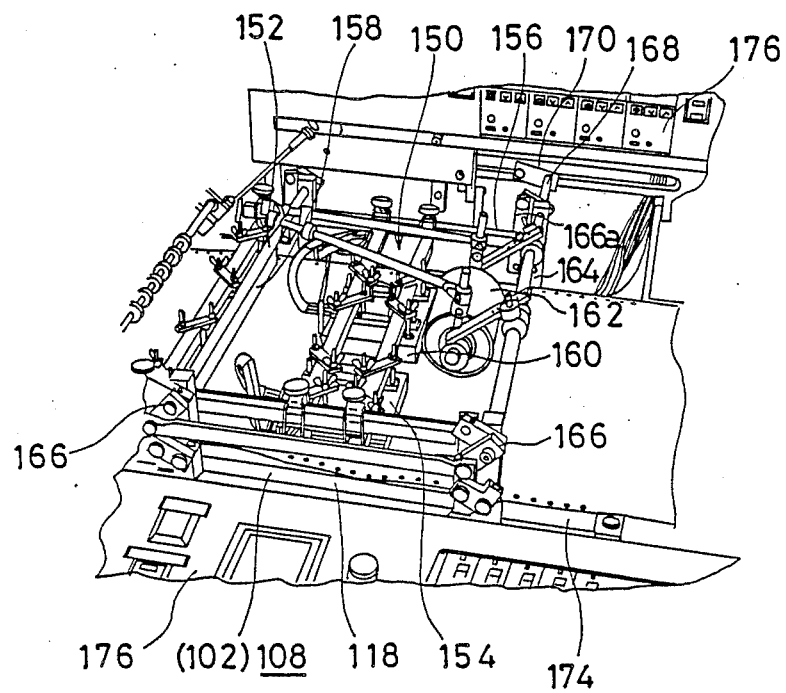
FIG. 19A is a perspective view showing an essential portion of a pressing and heating unit.
Figure 19B:
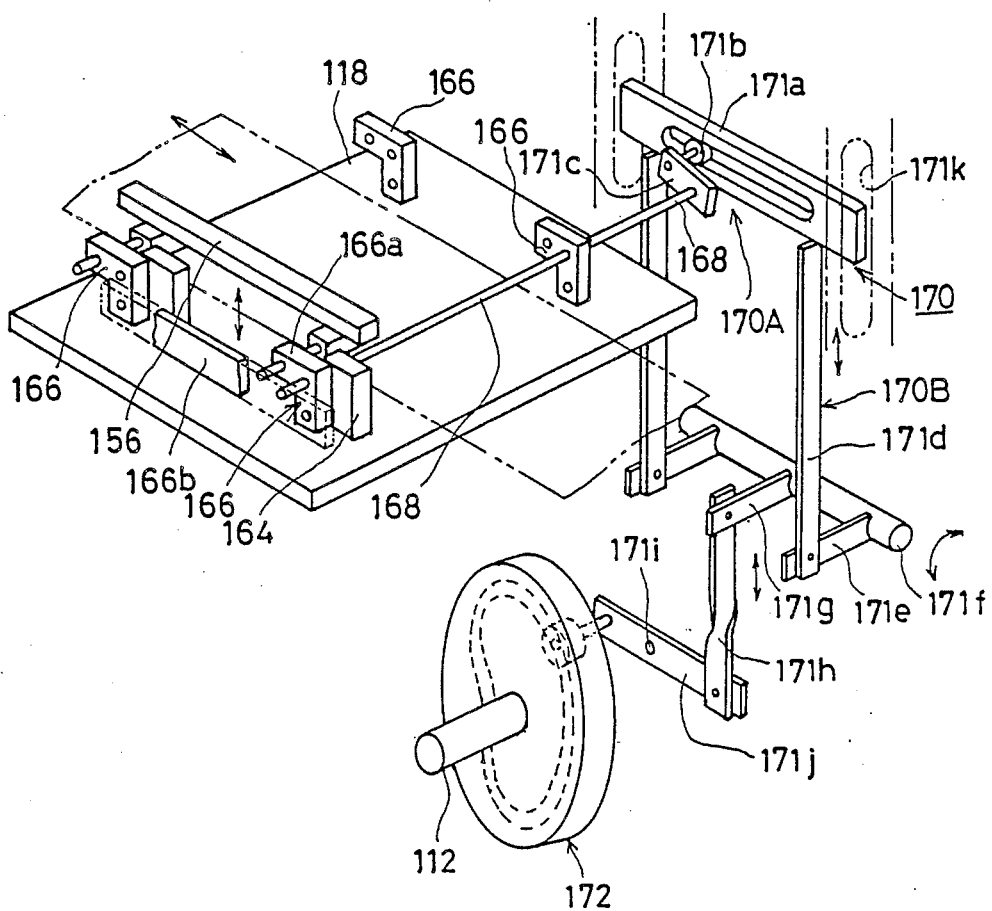
FIG. 19B is a diagrammatical view showing an essential portion of its backside.

Next, a pressing and heating unit 150 which adheres the sticking material 312 to the continuous raw paper 310a will be explained with reference to FIGS. 19A and 19B.

In the embodiment, the pressing and heating unit 150 includes a linear pressing and heating device 152 which presses the front end of the continuous sheet 312a of the sticking materials linearly in the breadthwise direction of the continuous raw paper 310a to adhere it primarily thereto, and a flat pressing and heating device 154 which adheres the sticking material 312 adhered to the continuous raw paper 310a at its front end by the linear pressing and heating device 152 to the continuous raw paper 310a.

The pressing and heating unit 150 includes a square-frame transfer pedestal 156. To the transfer pedestal 156, a linear heater 158 forming the linear pressing and heating device 152 and a plate heater 160 forming the flat pressing and heating device 154 are secured. The plate heater 160 has substantially the same area as the sticking material 312.

Furthermore, in the present embodiment, a press roller 162 is fixed pivotally to the transfer pedestal 156. The press roller 162 is designed to press the sticking material 312 adhered to the continuous raw paper 310a by the plate heater 160 to ensure close adhesion. The transfer pedestal 156 onto which the linear heater 158 and flat heater 160 are mounted is fixed movably above the adhesive portion transfer table 118, thereby the continuous raw paper 310a is transferred between the linear heater 158, plate heater 160 and press roller 162 and the adhesive portion transfer table 118. The transfer pedestal 156 is designed to advance back and forth together with the adhesive portion transfer table 118 along the transferring direction of the continuous raw paper 310a.

The transfer pedestal 156 is fixed to a support 164 secured upwardly at the side of adhesive portion transfer table 118 through a link mechanism 166 movably vertically such that the linear heater 158 and plate heater 160 can be attached to the adhesive portion transfer table 118 and detached from it.

That is, an approximately L-shaped link 166a of the link mechanism 166 is fixed pivotally to the transfer pedestal 156 at one end, and to the support 164 pivotally at its center by a shaft 168. A pair of same link mechanisms 166 on the upstream and downstream sides are connected by a turnbuckle 166b at the other end of the link 166a so as to operate similarly. The shaft 168 is fixed pivotally to the support 164, thereby the transfer pedestal 156 is moved vertically together with the linear heater 158 and plate heater 160.

The shaft 168 is connected to a disc 172 formed with a cum groove through another link mechanism 170 disposed at one end. The disc 172 is fixed to the shaft 112 to which the continuous paper transfer cum 114 and disc 142 are secured.

The link mechanism 170 includes a rocking and straight moving link mechanism 170A constituted by a guide 171a provided with a slot in the center, a rotor 171b which moves in the slot while rotating and a link 171c connecting the shaft 168 and the rotor 171b. Additionally, the link mechanism 170 includes a vertically moving link mechanism 170B which moves the guide 171a vertically and constituted by a link 171d connected to the guide 171a, a link 171e fixed pivotally to the link 171d, another link 171g connected to the other end of the link 171e through a pivot shaft 171f, link 171h connected pivotally to the link 171g and a link 171j connected to the link 171h at its one end and fixed to the adhesion machine body 104 by a pivot axis 171i.

By the action of cum groove formed in the disc 172, the vertically moving link mechanism 170B is actuated, and by the action of the link mechanism 170B, the guide 171a moves up and down in a slot 171k formed vertically in the adhesion machine body 104, thereby the link 171c of the rocking and straight moving link mechanism 170A is rocked, rotating the shaft 168 at a suitable angle to move the transfer pedestal 156 vertically by the action of another link mechanism 166 previously described.

In the embodiment, though the linear heater 158 and plate heater 160 are secured integrally to the transfer pedestal 156, they are each controlled by temperature controllers (not shown) separately to keep suitable temperatures.

Reason for controlling the heater temperature separately is to enabling a delicate adjustment depending upon characteristics or the like of the heat adherent resin layer 320 formed on the sticking material 312.

Now, operating conditions of the adhesion machine of the sticking material will be explained with reference to time charts shown in FIG. 20.

A prescribed amount of continuous raw paper 310a is transferred by the transfer sprockets 106 of the continuous paper tranfer unit 102.

The adhesive portion transfer table 118, in the present embodiment, is moved from the downstream side to the upstream side of the continuous raw paper 310a.

While, as the continuous sheet 312a of the sticking material is transferred from the reel 122 by the sticking material transfer unit 120, the sticking material detector 124 detects a detecting mark, an arrow in this embodiment, formed on the continuous sheet 312a of the sticking material, and by the detecting signal of the sticking material detector 124, the continuous sheet 312a is stopped temporarily as well as the adhesive portion transfer table 118. At this time, the sticking material cutter 126 is actuated and the cutter blades 130a and 130b cut the continuous sheet 312a of the sticking material into a suitable size, that is, a sheet of sticking material 312 by the action of cum groove in the disc 142.

The front end of the sticking material 312 cut into the suitable size by the sticking material cutter 126 is positioned at the optimum location on the continuous raw paper 310a, pressed and heated linearly in the breadthwise direction of the continuous raw paper 310a by the lineal pressing and heating device 152 forming the pressing and heating unit 150 to adhere primarily to the continuous raw paper 310a.

Then, simultaneously with pressing and heating, the continuous raw paper 310a is transferred by a fixed distance, corresponding approximately to the length of the sticking material 312 in this embodiment, to the downstream side by the action of continuous paper transfer unit 102. That is simultaneously, with pressing and heating of the sticking material 312 and postcard material 310 which were positioned under the flat pressing and heating device 154 in the previous cycle, the sticking material 312 is transferred by the prescribed distance as the continuous raw paper 310a moves to the downstream side.

After the adhesive portion transfer table 118 has moved by a prescribed amount on rails 174, the lineal pressing and heating device 152 and flat pressing and heating device 154 are again detached from the adhesive portion transfer table 118 by the action of cum groove in the disc 172 and positioned thereabove. At the same time, the lineal pressing and heating device 152 and flat pressing and heating device 154 are moved together with the adhesive portion transfer table 118 inversely to the flaw of continuous raw paper 310a, or to the prescribed position on the original upstream side. At this time, the press roller 162 presses the sticking material 312 while rotating.

Then, at the front end position of the following sticking material 312 transferred in the next cycle through cutting and other processes of the continuous sheet 312a of the sticking materials, the adhesive portion transfer table 118 and the linear pressing and heating device 152 and flat pressing and heating device 154 forming the pressing and heating unit 150 are reengaged. At this time, the sticking material 312 transferred in the previous cycle is positioned under the flat pressing and heating device 154. The continuous raw paper 310a adhered with the front end of the sticking material 312 of the next cycle is transferred by a prescribed distance by the action of the continuous paper transfer unit 102, and at the same time the front sticking material 312 transferred previously in the earlier cycle is pressed and heated by the flat pressing and heating device 154.

That is, when the sticking material 312 adhered at its front end is positioned under the flat pressing and heating device 154, initial upstream position, which is pressed to the surface of the adhesive portion transfer table 118 by the action of cum groove formed in the disc 172 to press and heat the sticking material 312.

Meanwhile, the transferring distance of the continuous raw paper 310a is restricted by a pulse sent from the encoder disposed on the continuous paper transfer unit 102, and transfer of the sticking material transfer unit 120, sticking material cutter 126 and pressing and heating unit 150 is controlled by a central processing unit 176. However, the continuous raw paper 310a is designed not to advance reversely in response to the backward movement of the adhesive portion transfer table 118 and the linear pressing and heating device 152 and flat pressing and heating device 154 of the pressing and heating 150.

The pressing and heating unit 150 thus repeats a cycle of forward movement, reflection point (downstream side), backward movement and reflection point (upstream side), and the sticking material 312 is adhered suitably to the surface of the postcard material 310 constituting the continuous postcard 300 as shown in FIG. 10.

The continuous postcard 300 thus covered with the sticking material 312 partly is folded suitably before separated.

Figure 21A:
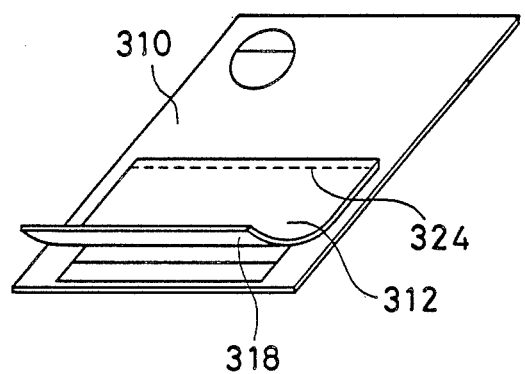
FIG. 21A is a perspective view showing a state which the sticking material is peeled off from the postcard material of the embodiment of FIG. 10.
Figure 21B:
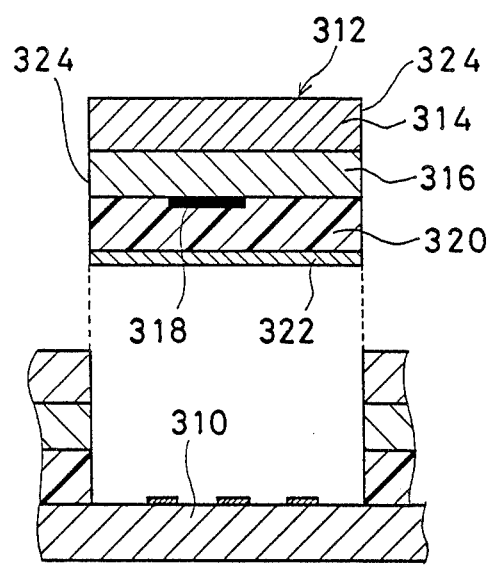
FIG. 21B is a partially sectional view thereof.

In this continuous postcard 300, the heat adherent resin layer 320 is adhered strongly to the postcard material 310 at the exposed portion of the heat adherent resin layer 320, and the heat adherent resin layer 320 of the bottom layer is adhered weakly at the portion where the adhesion retarding layer 322 is formed. Thus, as shown in FIG. 21A and FIG. 21B, the sticking material 312 can be peeled off relatively easily from the postcard material 310 at the portion where the adhesion retarding layer 322 is formed, and the lottery 318 can be seeing.

Figure 22A:
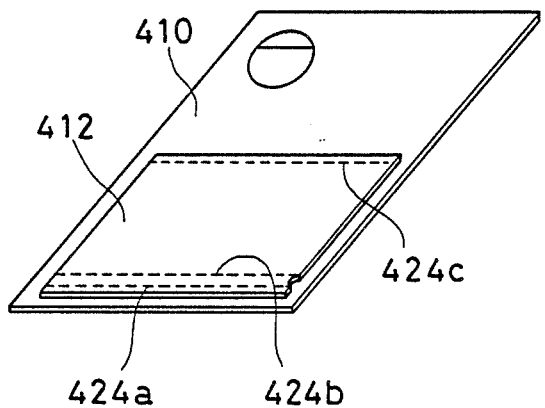
FIG. 22A and FIG. 22B are views showing a further separate embodiment.
Figure 22B:
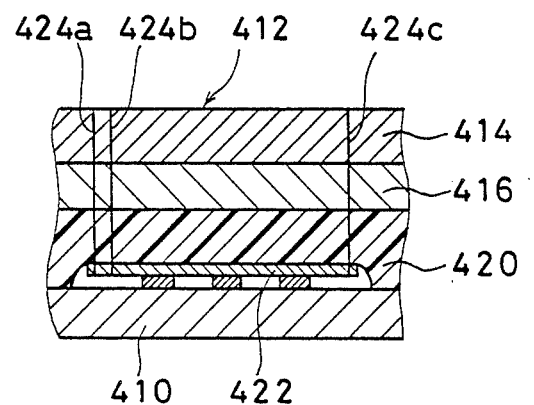
Figure 23:
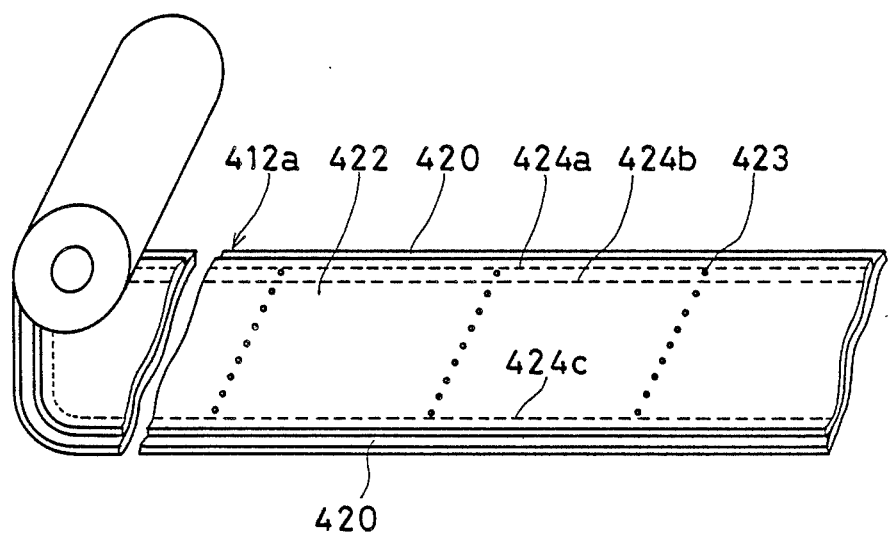
FIG. 23 is a perspective view of a sticking material of the embodiment of FIG. 22A and FIG. 22B.
Figure 24A:
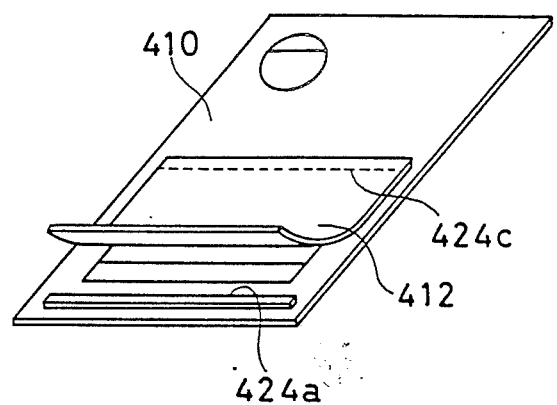
FIG. 24A and FIG. 24B are views showing a peeled state of the embodiment of FIG. 22A and FIG. 22B.
Figure 24B:
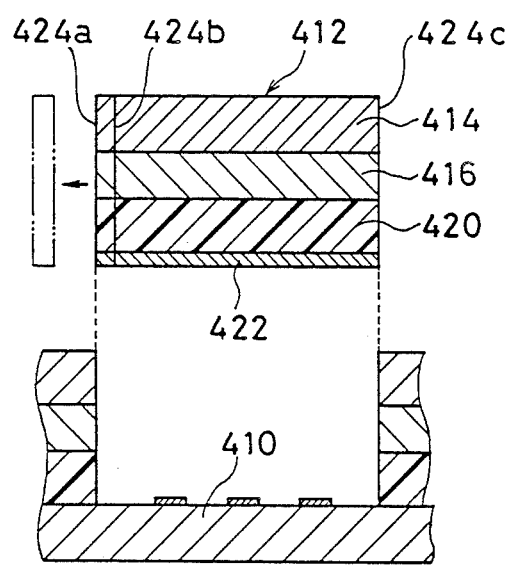

FIG. 22A through FIG. 24B are views showing a further separate embodiment. FIG. 22A and FIG. 24A are perspective views showing the embodiment, FIG. 22B and FIG. 24B are partially sectional views of the embodiment. FIG. 22A and FIG. 24A are views showing an original state thereof, and FIG. 22B and FIG. 24B are views showing a peeled state thereof.

In this embodiment, perforations 424a and 424b are formed on the downside of a sticking material 412, in a portion where an adhesion retarding layer 422 is formed. The perforations 424a and 424b are formed extending from one edge to the other edge of the sticking material 412, and are parallel with each other at a narrow distance. Thus, the base material 414 can be cut off.

Furthermore, between the perforations 424a and 424b, one edge of the base material 414 is chipped, thus the edge can be easily peeled by a finger and a fingernail, and the base material 414 can be easily cut off. On the edge of the base material 414 between the perforations 414a and 414b, a protruding piece for picking the base material 414 easily may be formed in place of the edge is chipped.

Also, a perforation 424c for separation is formed to the upside of the sticking material 414 and to cut the sticking material 412 peeled from a postcard material 410 from a portion adhered completely with a heat adherent resin layer 420.

When the base material 414 is made of paper, the perforations 424a, 424b and 424c are formed along a direction which is a paper transferring direction in a papermaking, that is, a paper fiber line direction.

Also, a lottery 418 is formed on the postcard material 410 in this embodiment.

In this embodiment, as shown in FIG. 23, first, on one main surface of the base material 414, the suppression layer 416, the heat adherent resin layer 420 and the adhesion retarding layer 422 are formed. Thus, a continuous sheet 412a of the sticking material, which includes exposed spots 423 for exposing the heat adherent resin layer 420 in spots at portions corresponding to the length of the sticking material 420, is formed.

Next, the base material 414 is led to a perforator for cutting the perforations 424a, 424b and 424c, thereby forming the perforations 424a, 424b, and 424c at a distance, and then is rolled.

The rolled base material 414 is led to an adhesion machine for adhering the sticking material 412 to the postcard material 410, thereby the sticking material 412 is heated and adhered to the postcard material 410, thus a postcard is formed.

Although the present invention has been particularly described and illustrated in the drawings, it is to be understood that such description is for illustrative purpose only and not restrictive. The spirit and scope of the present invention is, therefore, to be determined solely by the appended claims.

What is claimed is:

1. A mail item comprising a mailable material and a sticking means adhered to said mailable material, said sticking means comprising a base means, a heat adherent resin layer on said base means adheringly attaching said base means to said mailable material, an adhesion retarding layer on a portion of said heat adherent resin layer disposed between said heat adherent resin layer and said mailable material such that said portion of said heat adherent resin layer is weakly adhered to said mailable material compared to the adherence where there is no adhesion retarding layer, and perforation means in said sticking material extending through said base material means and said heat adherent resin layer at a location such that a portion of said sticking means juxtaposed to said perforation means and overlying said adhesion retarding layer is removeable from said mailable material while the remainder of said sticking material means remains adheringly attached to said mailable material by said heat adherent resin layer.

2. A mail item according to claim 1, wherein said base means has one side facing said heat adherent resin layer, said one side being entirely coated with said heat adherent resin material.

3. A mail item according to claim 1, wherein said base means comprises a base material and a suppression layer on the side of said base material facing said heat adherent resin material.

4. A mail item according to claim 3, wherein said suppression layer means comprises ink.

5. A mail item according to claim 3, wherein said suppression layer comprises a film material.

6. A mail item according to claim 3, wherein said suppression layer material means comprises a metal foil.

7. A mail item according to claim 1, wherein said perforation means comprises two generally spaced and parallel lines of perforation, said two lines of perforation defining outer boundaries of said section of sticking material removed from said mailable material.

8. A mail item according to claim 1 further comprising indicia means on said base means.

9. A mail item according to claim 8, wherein said adhesive retardant layer and said heat adherent resin layer are made of non-opaque material so that said indicia means on said base means is viewable through said non-opaque adhesive retardant layer and said non-opaque heat adherent resin layer after said section of said sticking material has been removed from said mailable material.

10. A mail item according to claim 1, wherein said base means comprises a base material and a suppression layer on the side of said base material facing said heat adherent resin material such that said suppression layer is sandwiched between said base material and said heat adherent resin layer, and indicia means on the side of suppression layer facing said heat adherent resin layer.

11. A mail item according to claim 1 further comprising indicia means on said mailable material underlying said adhesion retardant layer such that said indicia means on said mailable material can be viewed after said section of said sticking material has been removed from said mailable material.

12. A mail item according to claim 1, wherein said adherent resin layer has outer boundaries, said perforation means being generally aligned with at least parts of said outer boundaries.

13. A mail item according to claim 1, wherein the section of said sticking means which does not form said removeable section comprises two spaced strips which remain adhered to said mailable material by said heat adherent resin layer after said removeable portion has been removed from said mailable material.

14. A mail item according to claim 1, wherein said mailable material comprises an elongated card, said perforation means comprising lines of perforation generally parallel to the longitudinal extent of said elongated card.

15. A mail item according to claim 1, wherein said perforation means comprises three parallel perforation lines with one of said three lines being an intermediate line disposed between two outer lines, said intermediate line being spaced from one of said outer lines a first distance, said intermediate line being spaced from said other outer line by a second distance, said first distance being less than said second distance.

16. A mail item according to claim 15, wherein the space between said intermediate line and said one outer line defines a strip part and the spaced between said intermediate line and said other outer line defines a main part, said strip part and said main part being separately removeable from said mailable material.

17. A mail item according to claim 16, wherein said strip part is elongated in a longitudinal direction parallel to said perforation lines and has one longitudinal end portion adapted to be grasped to effect peeling off of said strip part in a direction parallel to said longitudinal direction.

18. A mail item according to claim 1, wherein said adhesive retardant layer comprises an ink material.

19. A mail item according to claim 1, wherein said adhesive retardant layer comprises an ultraviolet ray curing ink.

20. A mail item according to claim 1, wherein said mailable material is flat.

21. A mail item according to claim 1, wherein said mailable material is a postcard.

22. A mail item according to claim 1, wherein said heat adherent resin layer has a melting temperature within the range of 100° C. to 200° C.

23. A postcard comprising a postcard material and a sticking means adhered to said postcard material, said sticking means comprising a base means, a heat adherent resin layer on said base means adheringly attaching said base means to said postcard material, an adhesion retarding layer on a portion of said heat adherent resin layer disposed between said heat adherent resin layer and said postcard material such that said portion of said heat adherent resin layer is weakly adhered to said postcard material compared to the adherence where there is no adhesion retarding layer, and perforation means on said sticking material extending through said base means and said heat adherent resin layer at a location such that a portion of the sticking means juxtaposed to said perforation means and overlying said adhesion retarding layer is peelable from said postcard material while the remainder of said sticking means remains adheringly attached to said postcard material by said heat adherent resin layer.

* * * * *